United States Patent [19]
Weck

[11] Patent Number: 6,037,549
[45] Date of Patent: Mar. 14, 2000

[54] COMBINATION SCALE

[75] Inventor: Josef Weck, Gars-Bahnhof, Germany

[73] Assignee: Multipond Wagetechnik GmbH, Waldkraiburg, Germany

[21] Appl. No.: 08/973,615

[22] PCT Filed: Apr. 29, 1997

[86] PCT No.: PCT/EP97/02205

§ 371 Date: Dec. 19, 1997

§ 102(e) Date: Dec. 19, 1997

[87] PCT Pub. No.: WO97/42472

PCT Pub. Date: Nov. 13, 1997

[30] Foreign Application Priority Data

May 3, 1996 [DE] Germany .......................... 196 17 821

[51] Int. Cl.[7] ........................ G01G 19/393; G01G 13/00; B65G 27/08
[52] U.S. Cl. ............. 177/25.18; 177/119; 177/DIG. 11; 198/766; 366/111; 222/196
[58] Field of Search .................................... 198/766, 767, 198/768, 769, 770; 177/25.18, 119, 120, 121, DIG. 11, 58; 366/111, 112, 114; 222/196, 199, 415

[56] References Cited

U.S. PATENT DOCUMENTS

| 4,600,096 | 7/1986 | Yamano et al. | 177/58 |
| 4,700,827 | 10/1987 | Haaser | 198/771 |
| 4,702,394 | 10/1987 | Katzoka | 222/77 |
| 5,773,765 | 6/1998 | Sashiki et al. | 177/25.18 |

FOREIGN PATENT DOCUMENTS

| 0 577 851 A1 | 1/1994 | European Pat. Off. . |
| 0 677 460 A2 | 10/1995 | European Pat. Off. . |
| 42 34 170 A1 | 7/1993 | Germany . |
| WO 93/15003 | 8/1993 | WIPO . |

*Primary Examiner*—Randy W. Gibson
*Attorney, Agent, or Firm*—George W. Neuner

[57] ABSTRACT

A combinatorial weighing apparatus comprises weighing receptacles (5), a distributing device (1) for distributing products to be supplied, a feeding device (2) for feeding the products from the distributing device (1) to a respective one of the weighing receptacles (5), a driving device (3) for oscillating the feeding device (2) and a coupling device (4) for detachably coupling the feeding device (2) to the driving device (3) with a first coupling piece (12) and a second coupling piece (8), a slide (23) which is displaceably connected to the first coupling piece (12), one of the coupling pieces (8, 12) being connected with the feeding device (2) and the other coupling piece (12, 8) being connected to the driving device (3), a tension member (33) connected to the slide (23) for displacing the slide (23) along a displacement direction from a first position into a second position in which the slide (23) can be locked against displacement into the first position, a support bolt (19) having a shaft (20) and a head (21) connected to the shaft (20), an elongate hole (28) extending substantially parallel to the displacement direction and having a first portion (29) which is greater than the head (21) and a subsequent second portion (30, 31) which is smaller than the head (21), the slide (23) and the second coupling piece (8) forming two coupling members, the shaft (20) being connected to one of the coupling members and the elongate hole (28) being connected to the other one of the coupling members. The combinatorial weighing apparatus guarantees a reliable, detachable and playfree coupling of feeding device and driving device.

11 Claims, 7 Drawing Sheets

COMBINATION SCALE

The present invention relates to a combinatorial weighing apparatus.

In combinatorial weighing apparatus the products to be weighed are distributed by a distributing device and fed to the individual weighing receptacles by vibrating channels which are oscillated by electromagnetic driving devices. It is a requirement of such combinatorial weighing apparatus that the vibrating channel can be easily dismounted for cleaning purposes.

Document EP 0 677 460 A2 describes a combinatorial weighing apparatus with a first cylindrical flange being mounted to the vibrating channel. The driving apparatus comprises a second cylindrical flange. Both flanges are interconnected by a circular clamp.

Document U.S. Pat. No. 4,702,394 discloses a combinatorial weighing apparatus having the vibrating channels screwed to the respective vibrating motors. The vibrating motors are each resiliently connected to a base plate. Each base plate has an elongate hole with a first portion, a subsequent second portion, a further subsequent third portion and a fourth portion following the third portion. The first and third portions are smaller than the head of a connection pin and the second and fourth portions are wider than the head of the connection pin. A table has two spaced connection pins arranged thereon for each base plate. The base plate is placed onto the table so that the two connection pins extend through the second and fourth region, resp. To effect the connection between the base plate and the table, the base plate is displaced to bring the shafts of the two connection pins into engagement with the first and third region, resp.

It is the object of the invention to provide a combinatorial weighing apparatus having a coupling device for detachably coupling the vibrating channel with the driving apparatus to ensure an improved and easily operable connection between the vibrating channel and the driving apparatus.

This object is achieved by the combinatorial weighing apparatus defined in claim 1.

The combinatorial weighing apparatus guarantees a reliable and playless connection between the vibrating channel and the vibrating motor.

Further developments of the invention are defined in the subclaims.

In the following an embodiment will be described with reference to the Figures. In the Figures.

Figure 1:
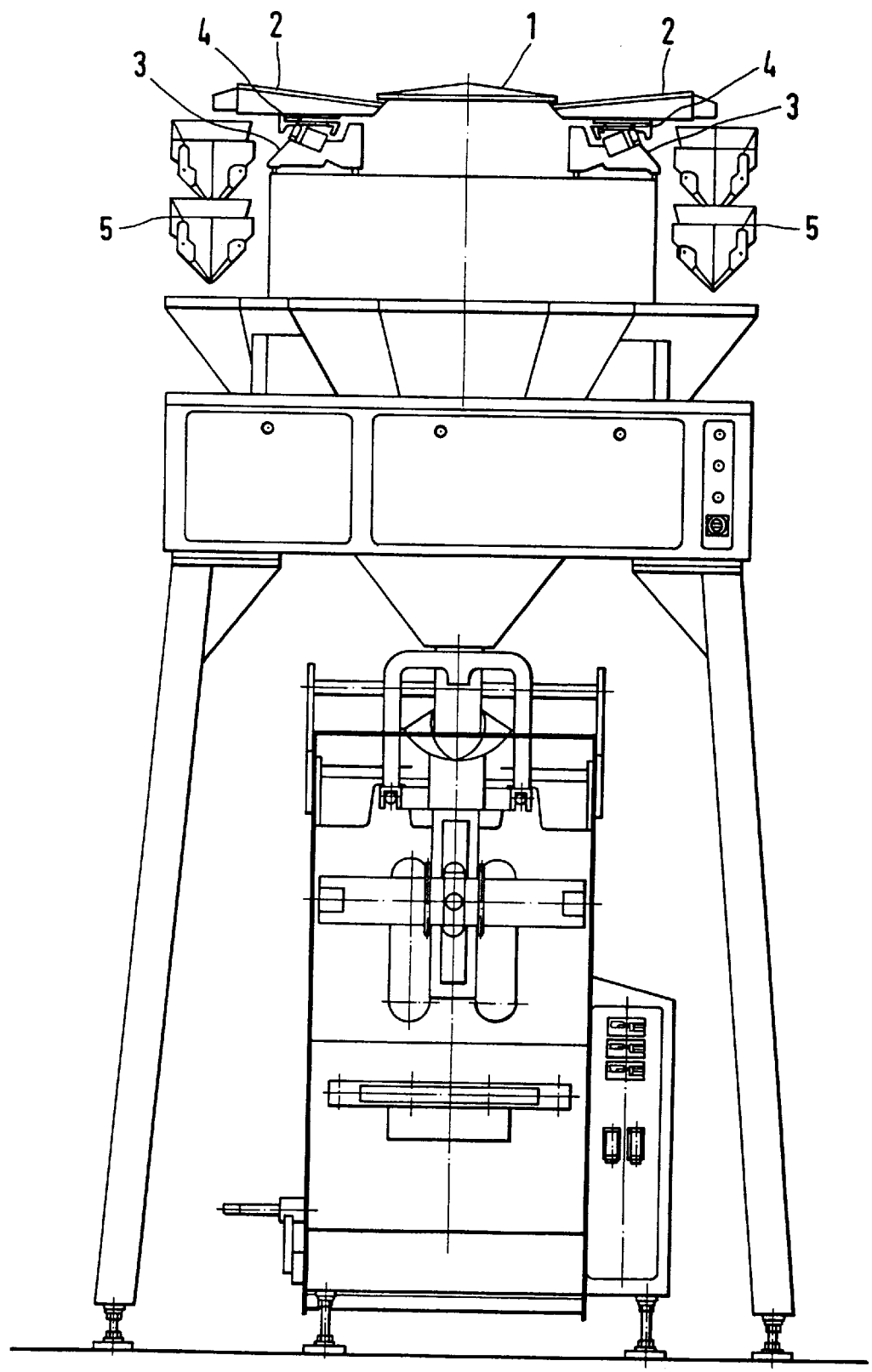
FIG. 1 shows a combinatorial weighing apparatus.

As shown in FIG. 1, the combinatorial weighing apparatus comprises a distributing device 1, vibrating channels 2, driving devices 3, coupling devices 4 and weighing receptacles 5. A respective coupling device 4 connects a vibrating channel 2 with a driving device 3.

Figure 2:
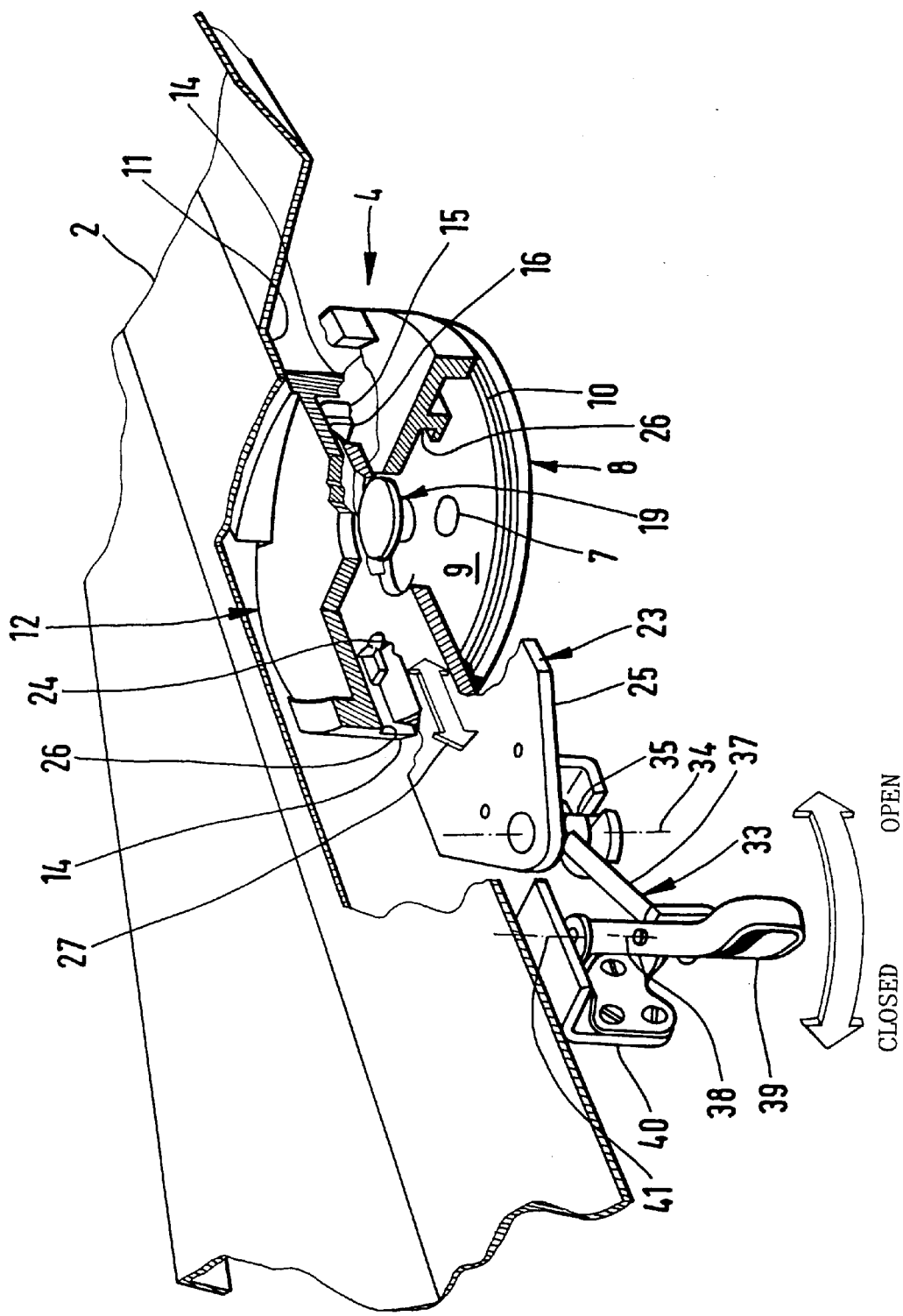
FIG. 2 is a perspective view of the coupling device according to the invention.
Figure 3:
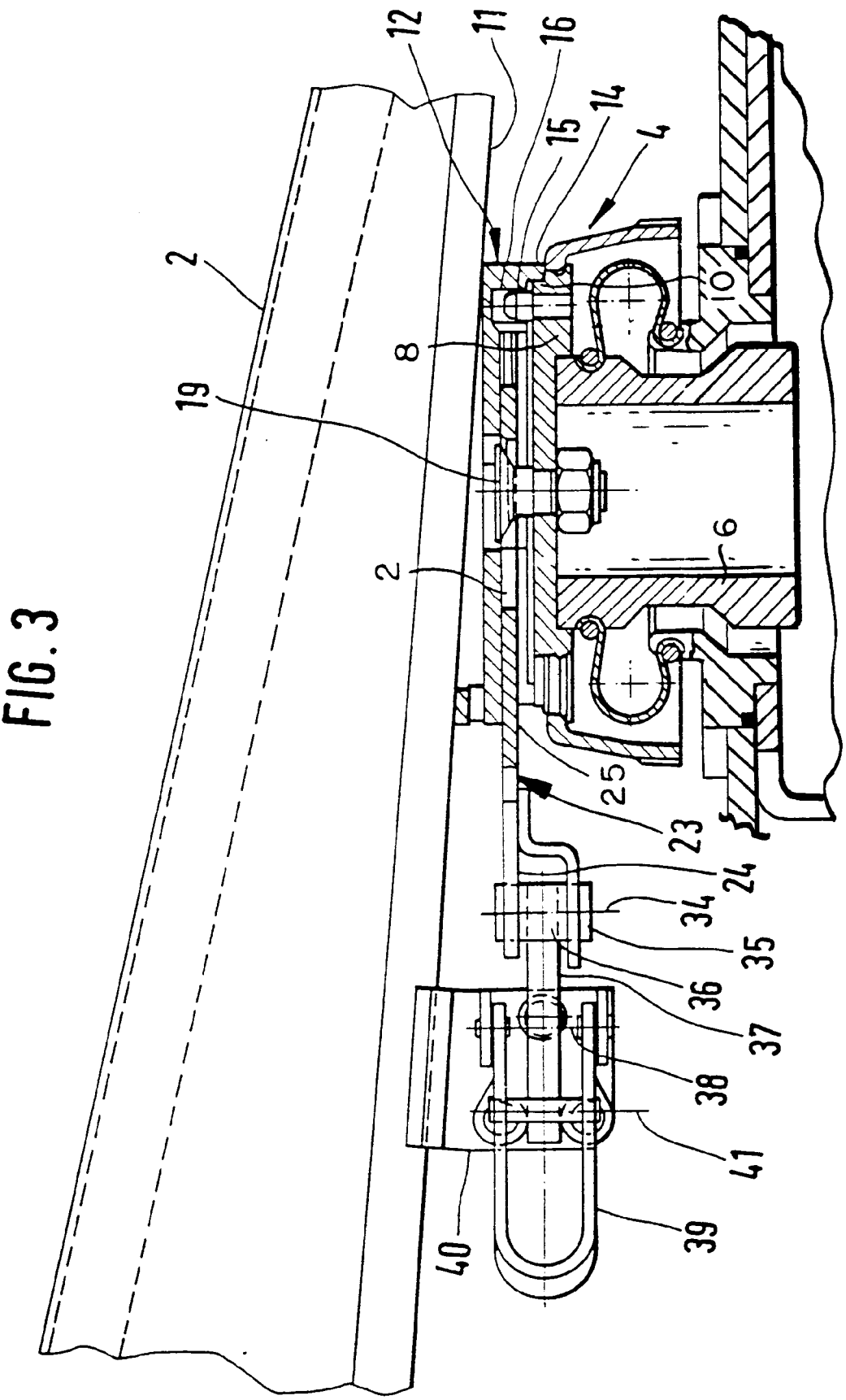
FIG. 3 shows a partial sectional view of the coupling device.
Figure 4:
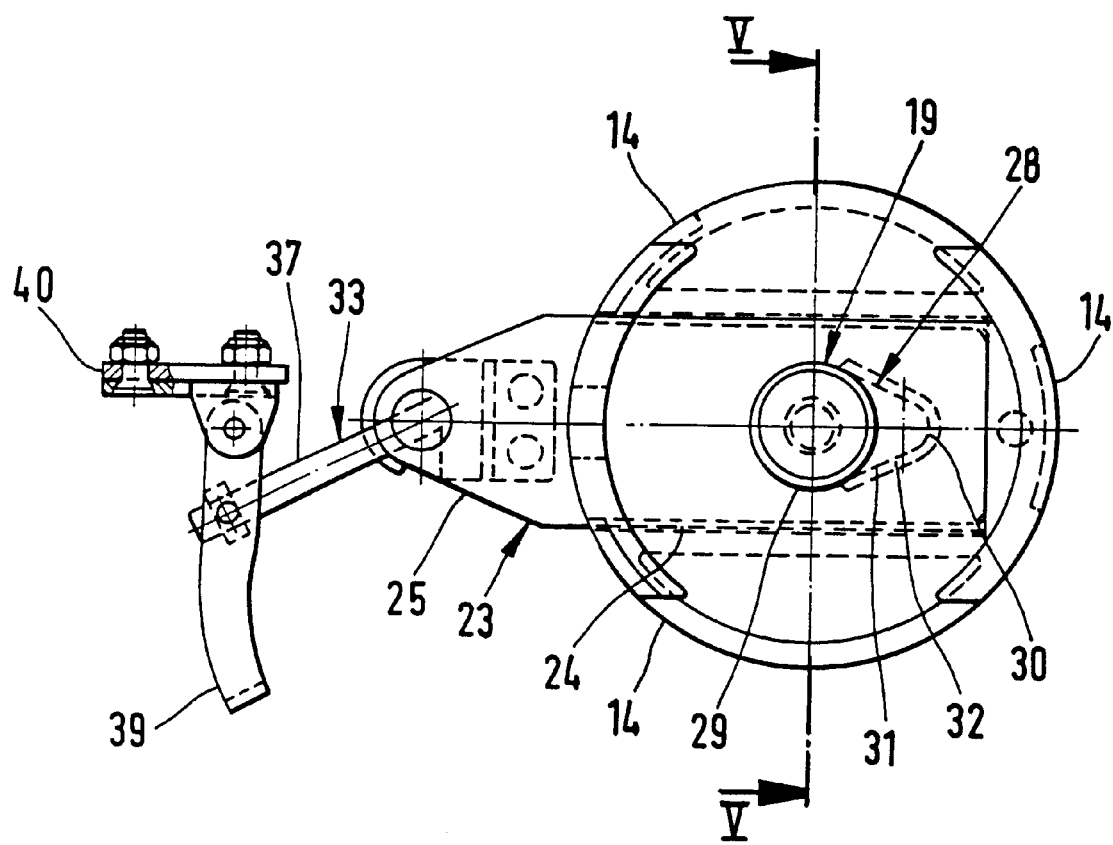
FIG. 4 shows a top view of part of the coupling device with the slide being in a first position.

As in particular shown in FIGS. 2 and 3 the coupling device 4 comprises a cylindrical intermediate piece 6 having one end thereof connected to the driving device 3. The other end of the cylindrical intermediate piece 6 is connected to a bottom piece 8 through bolts 7. The disk-shaped bottom piece 8 comprises an upper side 9 opposite to the intermediate piece 6. A stepped shoulder 10 is provided at the outer circumference of the upper side 9. The coupling device 4 further comprises a counterpart 12 which is connected to the lower side 11 of the vibrating channel 2 and has a lower side 13 facing away from the vibrating channel 2. As best shown in FIGS. 2 and 4, the lower side 13 has three projections 14 projecting towards the bottom piece 8 and oriented perpendicular to the disk plane. The projections 14 are formed as segments of a cylindrical wall and circumferentially offset by 120°. The inner diameter of the segments is sized to snugly embrace the bottom piece 8 at the region of the shoulder 10. Thus, the counterpart 12 and the bottom piece 8 are fixed relative to each other against displacement in the plane of the bottom piece 8.

The bottom piece 8 carries a guide pin 15 projecting perpendicular to the upper side 9. A bore 16 receiving the guide pin 15 is provided in the lower side 13 of the counterpart 12. The diameter of the bore 16 is sized to removably insert the guide pin 15 without sticking. The guide pin 15, the shoulder 10 and the projections 14 define the angular position of the vibrating channel 2 relative to axis 18 of the distributing device 1 and to the weighing receptacle 5 so as to effect an optimum feed of the products from the distributing device 1 to the weighing receptacle 5.

Figure 5:
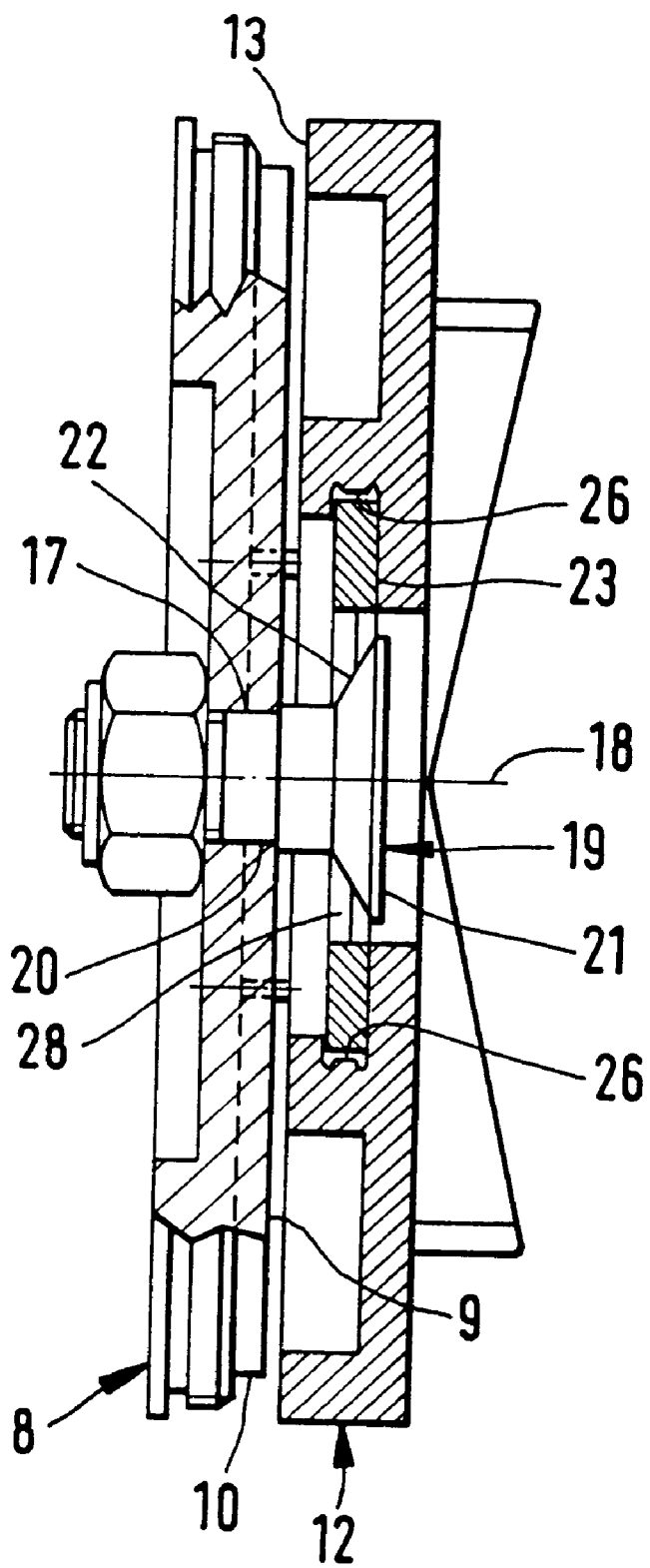
FIG. 5 is an enlarged cross-sectional view along line V—V of FIG. 4.
Figure 7:
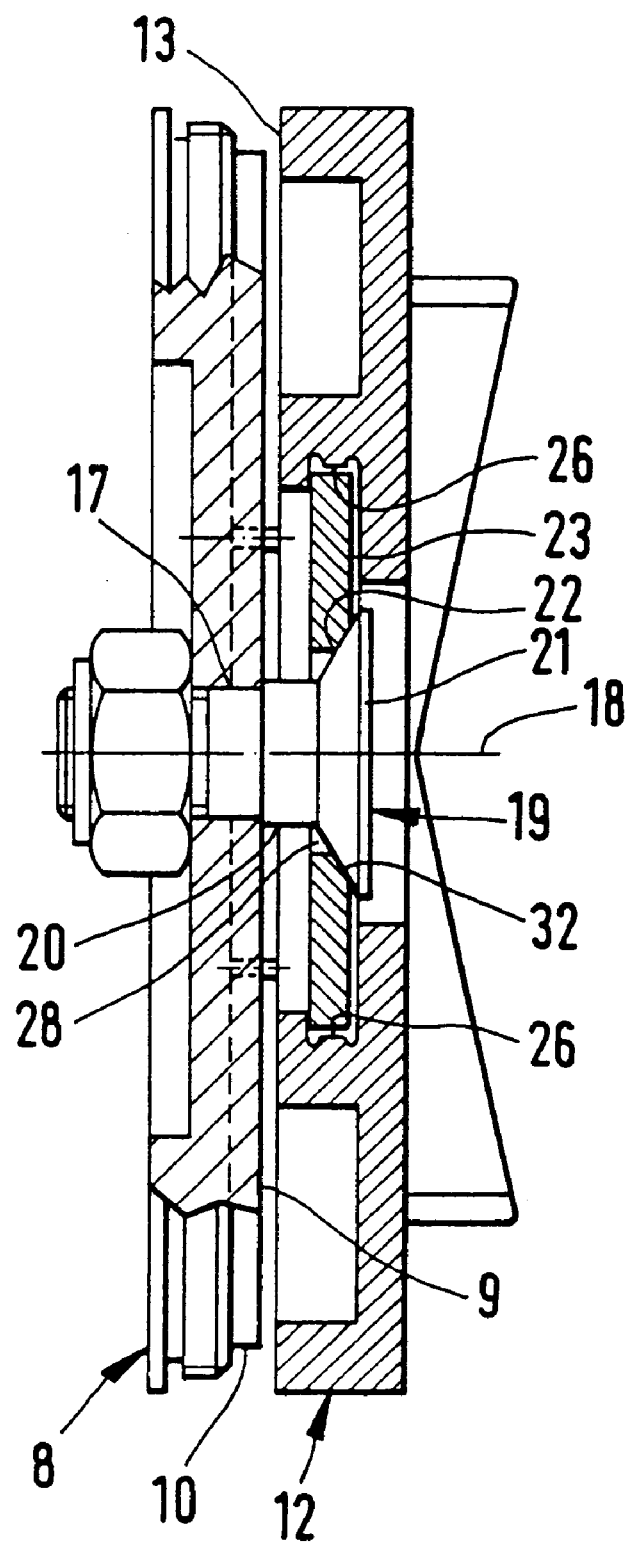
FIG. 7 shows an enlarged cross-sectional view along line VII—VII of FIG. 6.

As shown in FIGS. 5 and 7 a through-bore 17 having a bore axis 18 is provided in the center of the bottom piece 8. A support bolt 19 is arranged in the through-bore 17. The support bolt 19 comprises a shaft 20 with a head 21. Part of the shaft 20 and the head 21 project beyond the upper side 9 of the bottom piece 8. The head 21 of the support bolt 19 is mushroom-shaped or formed as a countersunk head, resp. A first contact surface 22 of the head 21 facing the bottom piece 8 is arranged obliquely relative to the upper side 9 in such a manner that the distance between the upper side 9 and the first contact surface 22 increases in a direction radially outward from the bore axis 18.

As shown in FIGS. 2 and 4 the coupling device 4 comprises a slide 23 with a first slide portion 24 having a rectangular shape, in a top view, and a constant thickness. The first slide portion 24 is followed by a second slide portion 25. A guide having two opposed grooves 26 is provided at the lower side 13 of the counterpart 12. The grooves 26 are substantially parallel to each other and to the lower side 13. The spacing between the grooves 26 is slightly larger than the width of the first slide portion 24 guided therein. The slide 23 is guided in the grooves 26 to be displaceable along the first and second displacement direction shown by the double arrow 27 in FIG. 2 from a first position into a second position and back. The length of the grooves 26 is chosen in such a manner that the second slide portion 25 projects from the counterpart 12.

Figure 6:
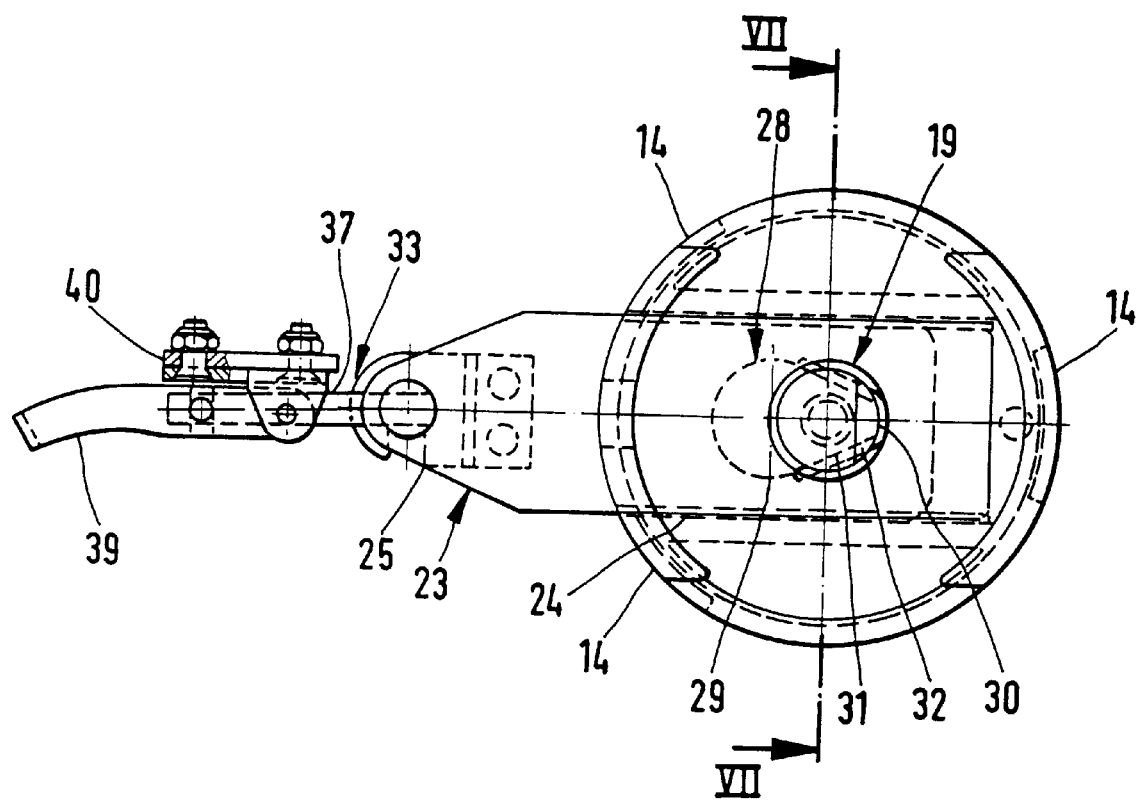
FIG. 6 shows a top view of a portion of the coupling device with the slide being in its second position.

The first slide portion 24 has an elongate hole 28 therein, a longitudinal axis of the elongate hole coinciding with the central axis of the slide 23 aligned in displacement direction. The elongate hole 28 comprises a first end bore 29 and a second end bore 30 spaced from the first end bore along the second displacement direction. The diameter of the first end bore 29 is larger than the head 21 of the support bolt 19 so that the head 21 can pass through the first end bore 29. The diameter of the second end bore 30 corresponds to, or is marginally greater than, the shaft 20 contingent with the head 21. The two end bores 29, 30 are interconnected by a tapering connecting portion 31, as best shown in FIGS. 4 and 6. The edge of the connecting portion 31 and of the second end bore 30 has, on the side of the slide 23 facing the vibrating channel 2, an inclined second contact surface 32. The second contact surface 32 tapers inwardly towards the elongate hole 28. The inclination of the second contact surface 32 corresponds to that of the first contact surface 22 to allow a surface contact with the first contact surface 22. The first end bore 29 is on the side of the second slide portion 25, whereas the second end bore is at the opposite side.

The coupling device 4 further comprises a tension member 33 which is connected to the second slide portion 25. The tension member 33 comprises a bearing pin 35 which is pivotally linked to the free end of the second slide portion 25 around a first axis 34 perpendicular to the lower side 13. The bearing pin 35 has a threaded bore 36 extending parallel to the lower side 13. The threaded portion at one end of a rod 37 is screwed into the threaded bore 36. The other end of the rod 37 is pivotally linked to a tension lever 39 around a second axis 38 extending parallel to the first axis 34. The tension lever 39 is pivotally connected around a third axis 41 which is parallel to the second axis 38 to a mounting piece 40 mounted to the vibrating channel 2.

In operation the vibrating channel 2 together with the counterpart 12, the slide 23 and the tension member 33 is placed onto the intermediate piece 6 and the bottom piece 8. To this end the slide 23 is brought into its first position shown in FIG. 4. The guide pin 15 engages the bore 16, the head 21 of the support bolt 19 projects into the first end bore 29 of the elongate hole 28 and the shoulder 10 engages the projections 14. This univocally defines the position of the vibrating channel 2. Now the tension lever 39 is turned from its open position shown in FIG. 2 into the tensioning position and the slide 23 is then displaced to the left from the first position shown in FIG. 4 to the second position shown in FIG. 6. This presses the first contact surface 22 of the head 21 against the second contact surface 32, whereby the counterpart 12 together with the vibrating channel 2 is pushed against the bottom piece 8 of the intermediate piece 6. The turned tension lever 39 locks the slide 23 in its second position.

The contact pressure can be adjusted through the effective length of the tension member 33. To this end the position of the rod 37 relative to the bearing pin 35 is varied by rotation of rod 37 in threaded bore 36.

I claim:

1. A combinatorial weighing apparatus comprising:

weighing receptacles, distributing means for distributing products to be supplied, feeding means for feeding the products from said distributing means to a respective one of said weighing receptacles, driving means for oscillating said feeding means and coupling means for detachably connecting said feeding means to said driving means, said coupling means comprising:

a first coupling piece and a second coupling piece, means for connecting one of said coupling pieces with said feeding means and the other coupling piece with said driving means, a slide, means for displaceably mounting said slide to said first coupling piece along a displacement direction, tension means coupled to said slide for displacing said slide along said displacement direction from a first position into a second position, means for locking said slide in said second position against displacement back into said first position, support bolt means having a shaft and a head connected thereto, an elongate hole having a first portion which is greater than said head and a subsequent second portion which is smaller than said head, said elongate hole extending substantially parallel to said displacement direction, said slide and said second coupling piece forming two coupling members, said shaft being connected to one of said coupling members and said elongate hole being provided in the other of said coupling members.

2. The combinatorial weighing apparatus of claim 1, wherein said elongate hole is provided in said slide and said shaft is provided in said second coupling piece.

3. The combinatorial weighing apparatus of claim 2, wherein said first portion of said elongate hole is arranged ahead of said second portion in the displacement direction for locking said slide.

4. The combinatorial weighing apparatus of claim 1, wherein said elongate hole is provided in said second coupling piece and said shaft is connected to said slide.

5. The combinatorial weighing apparatus of claim 4, wherein said second portion of said elongate hole is arranged ahead of said first portion in the displacement direction for locking said slide.

6. The combinatorial weighing apparatus of claim 1, further comprising means for connecting said first coupling piece to said feeding means.

7. The combinatorial weighing apparatus of claim 1, further comprising means for connecting said tension means to said feeding means.

8. The combinatorial weighing apparatus of claim 1, wherein said head is a countersunk head comprising an inclined first contact surface having a first inclination, wherein said second portion of said elongate hole comprises an oblique edge forming an inclined second contact surface, and wherein the inclination of said second contact surface corresponding to that of the first contact surface.

9. The combinatorial weighing apparatus of claim 1, further comprising a guide pin connected to one of said coupling pieces and a bore formed in the other of said coupling pieces for receiving said guide pin.

10. The combinatorial weighing apparatus of claim 1, further comprising a shoulder provided at an outer circumference of one of said coupling pieces and a projection formed at the other of said coupling pieces for embracing said shoulder.

11. The combinatorial weighing apparatus of claim 1, further comprising means for adjusting said second position of said slide along said displacement direction by said tension means.

* * * * *